(12) United States Patent
Santoso et al.

(10) Patent No.: US 8,280,610 B2
(45) Date of Patent: Oct. 2, 2012

(54) CONTROL SYSTEMS AND METHODS FOR FUEL AND SECONDARY AIR INJECTION

(75) Inventors: Halim G. Santoso, Novi, MI (US); Stuart R. Smith, Howell, MI (US); Eugene V. Gonze, Pinckney, MI (US)

(73) Assignee: GM Global Technology Operations LLC

( * ) Notice: Subject to any disclaimer, the term of this patent is extended or adjusted under 35 U.S.C. 154(b) by 798 days.

(21) Appl. No.: 12/472,771

(22) Filed: May 27, 2009

(65) Prior Publication Data

US 2010/0305830 A1    Dec. 2, 2010

(51) Int. Cl.
*F02D 41/40*    (2006.01)
*F02P 5/00*    (2006.01)
*F01N 3/00*    (2006.01)

(52) U.S. Cl. ............................. 701/103; 123/299; 60/285

(58) Field of Classification Search .......... 701/103–105; 123/299, 300, 406.44; 60/274, 276, 285
See application file for complete search history.

(56) References Cited

FOREIGN PATENT DOCUMENTS
EP    1035315 A2 *    9/2000

* cited by examiner

*Primary Examiner* — Hieu T Vo (57) ABSTRACT

An engine control system comprises an actuator control module and a tertiary injection module. The actuator control module provides secondary air to an exhaust system when a catalyst light-off mode is enabled and provides first and second injections of fuel to a cylinder during each engine cycle while the catalyst light-off mode is enabled. The tertiary injection module selectively provides a third injection of fuel to the cylinder during an exhaust phase of each engine cycle while the catalyst light-off mode is enabled. The first, second, and third injections are each separated by a period of time.

20 Claims, 6 Drawing Sheets

CONTROL SYSTEMS AND METHODS FOR FUEL AND SECONDARY AIR INJECTION

FIELD

The present disclosure relates to internal combustion engines and more particularly to engine control systems.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

An engine combusts an air/fuel mixture to generate drive torque for a vehicle. The air is drawn into the engine through a throttle valve and an intake manifold. The fuel is provided by one or more fuel injectors. The air/fuel mixture is combusted within one or more cylinders of the engine. Combustion of the air/fuel mixture may be initiated by, for example, injection of the fuel and/or spark provided by a spark plug. Combustion of the air/fuel mixture produces exhaust gas. The exhaust gas is expelled from the cylinders to an exhaust system.

The exhaust system includes a catalyst (e.g., three-way catalytic converter) that reacts with various components of the exhaust gas. The catalyst, however, may be unable to react when the temperature of the catalyst is less than a light-off temperature. Accordingly, the catalyst's reaction capability may be limited upon engine startup (e.g., key ON) when the catalyst temperature is likely less than the light-off temperature.

An engine control module (ECM) controls the torque output of the engine. For example only, the ECM controls the torque output of the engine based on driver inputs and/or other inputs. The ECM also controls various engine parameters to warm the catalyst when the catalyst temperature is less than the light-off temperature. For example only, the ECM may retard the spark timing to provide hydrocarbons in the exhaust gas. Oxidation of hydrocarbons in the exhaust system produces heat, which warms the catalyst.

The amount of heat produced via hydrocarbon oxidation is limited by the amount of oxygen in the exhaust system. A secondary air pump is mechanically coupled to a cylinder head to provide air directly to the cylinder head. The air delivered by the secondary air pump increases the amount of oxygen in the exhaust system and, therefore, the secondary air pump increases hydrocarbon oxidation capability. The ECM controls operation of the secondary air pump to control oxidation of hydrocarbons in the exhaust system and warm the catalyst.

SUMMARY

An engine control system comprises an actuator control module and a tertiary injection module. The actuator control module provides secondary air to an exhaust system when a catalyst light-off mode is enabled and provides first and second injections of fuel to a cylinder during each engine cycle while the catalyst light-off mode is enabled. The tertiary injection module selectively provides a third injection of fuel to the cylinder during an exhaust phase of each engine cycle while the catalyst light-off mode is enabled. The first, second, and third injections are each separated by a period of time.

In other features, the actuator control module retards a spark timing for the cylinder when the catalyst light-off mode is enabled.

In still other features, the engine control system further comprises a secondary air pump. The secondary air pump provides the secondary air to the exhaust system downstream of a turbine of a turbocharger.

In further features, the secondary air pump provides the secondary air downstream of the turbine by way of a coupling to a housing of the turbocharger.

In still further features, the engine control system further comprises a timing determination module. The timing determination module determines a desired timing based on an exhaust cam position and a spark timing. The tertiary injection module provides the third injection at the desired timing.

In other features, the engine control system further comprises an injection determination module. The injection determination module determines a desired amount based on the secondary air and an estimated temperature of a catalyst disposed in the exhaust system. The tertiary injection module provides the third injection based on the desired amount.

In still other features, the engine control system further comprises a light-off enabling module. The light-off enabling module selectively enables the catalyst light-off mode based on at least one of an engine coolant temperature, an estimated temperature of a catalyst disposed within the exhaust system, and a driver torque request.

In further features, the light-off enabling module enables the catalyst light-off mode when the engine coolant temperature is greater than a predetermined coolant temperature.

In still further features, the light-off enabling module enables the catalyst light-off mode when the estimated temperature is less than a predetermined catalyst temperature.

In other features, the light-off enabling module enables the catalyst light-off mode when the engine coolant temperature is greater than a predetermined coolant temperature, the estimated temperature is less than a predetermined catalyst temperature, and the driver torque request is less than a predetermined torque.

An engine control method comprises: providing secondary air to an exhaust system when a catalyst light-off mode is enabled; providing first and second injections of fuel to a cylinder during each engine cycle while the catalyst light-off mode is enabled; and selectively providing a third injection of fuel to the cylinder during an exhaust phase of each engine cycle while the catalyst light-off mode is enabled. The first, second, and third injections are each separated by a period of time.

In other features, the engine control method further comprises retarding a spark timing for the cylinder when the catalyst light-off mode is enabled.

In still other features, the engine control method further comprises providing the secondary air to the exhaust system downstream of a turbine of a turbocharger.

In further features, the engine control method further comprises providing the secondary air downstream of the turbine by way of a coupling to a housing of the turbocharger.

In still further features, the engine control method further comprises determining a desired timing based on an exhaust cam position and a spark timing and providing the third injection at the desired timing.

In other features, the engine control method further comprises determining a desired amount based on the secondary air and an estimated temperature of a catalyst disposed in the exhaust system and providing the third injection based on the desired amount.

In still other features, the engine control method further comprises selectively enabling the catalyst light-off mode based on at least one of an engine coolant temperature, an estimated temperature of a catalyst disposed within the exhaust system, and a driver torque request.

In further features, the engine control method further comprises enabling the catalyst light-off mode when the engine coolant temperature is greater than a predetermined coolant temperature.

In still further features, the engine control method further comprises enabling the catalyst light-off mode when the estimated temperature is less than a predetermined catalyst temperature.

In other features, the engine control method further comprises enabling the catalyst light-off mode when the engine coolant temperature is greater than a predetermined coolant temperature, the estimated temperature is less than a predetermined catalyst temperature, and the driver torque request is less than a predetermined torque.

Further areas of applicability of the present disclosure will become apparent from the detailed description provided hereinafter. It should be understood that the detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

The following description is merely exemplary in nature and is in no way intended to limit the disclosure, its application, or uses. For purposes of clarity, the same reference numbers will be used in the drawings to identify similar elements. As used herein, the phrase at least one of A, B, and C should be construed to mean a logical (A or B or C), using a non-exclusive logical or. It should be understood that steps within a method may be executed in different order without altering the principles of the present disclosure.

As used herein, the term module refers to an Application Specific Integrated Circuit (ASIC), an electronic circuit, a processor (shared, dedicated, or group) and memory that execute one or more software or firmware programs, a combinational logic circuit, and/or other suitable components that provide the described functionality.

Combustion of an air/fuel mixture produces exhaust gas that includes hydrocarbons, carbon oxides, water, and other substances. To warm a catalyst (e.g., a three-way catalyst) that receives exhaust gas from an engine, an engine control module (ECM) selectively delivers first and second injections of fuel to a cylinder of the engine during each engine cycle. The two-stage fuel injection produces exhaust gas including an increased amount of hydrocarbons. Oxidation of the hydrocarbons in the exhaust gas produces heat for warming of the catalyst.

The ECM of the present disclosure also provides a third (i.e., tertiary) injection of fuel to the cylinder during the exhaust phase (i.e., stroke) of each engine cycle. The exhaust phase corresponds to when a piston within the cylinder is moving to expel the exhaust gas produced by combustion from the cylinder. The third injection of fuel provides additional hydrocarbons in the exhaust gas without affecting the combustion of the air/fuel mixture. The additional hydrocarbons allow for more hydrocarbon oxidation and, therefore, faster warming of the catalyst to the light-off temperature after engine startup.

Figure 1A:
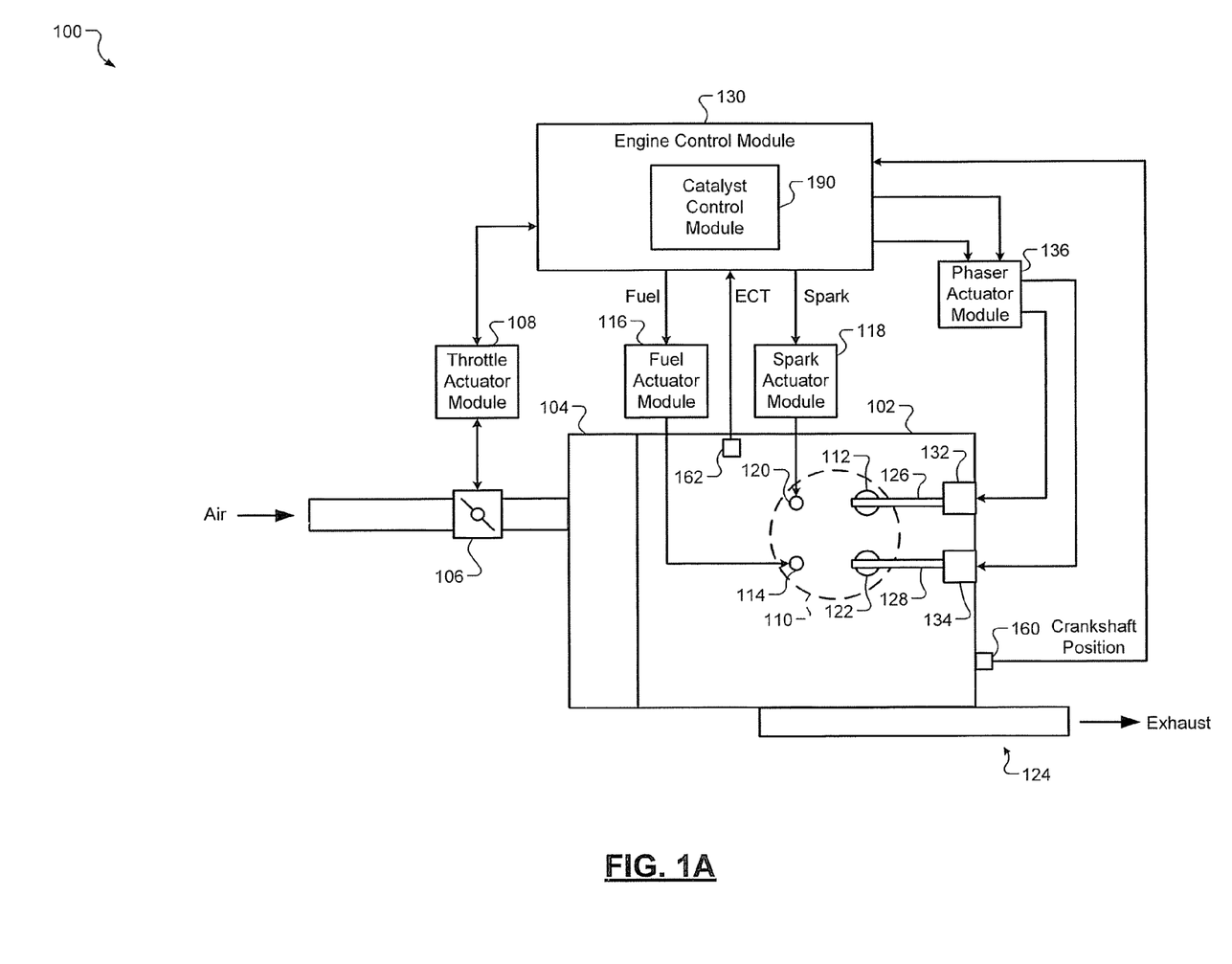
FIG. 1A-1B is a functional block diagram of an engine system according to the principles of the present disclosure.
Figure 1B:
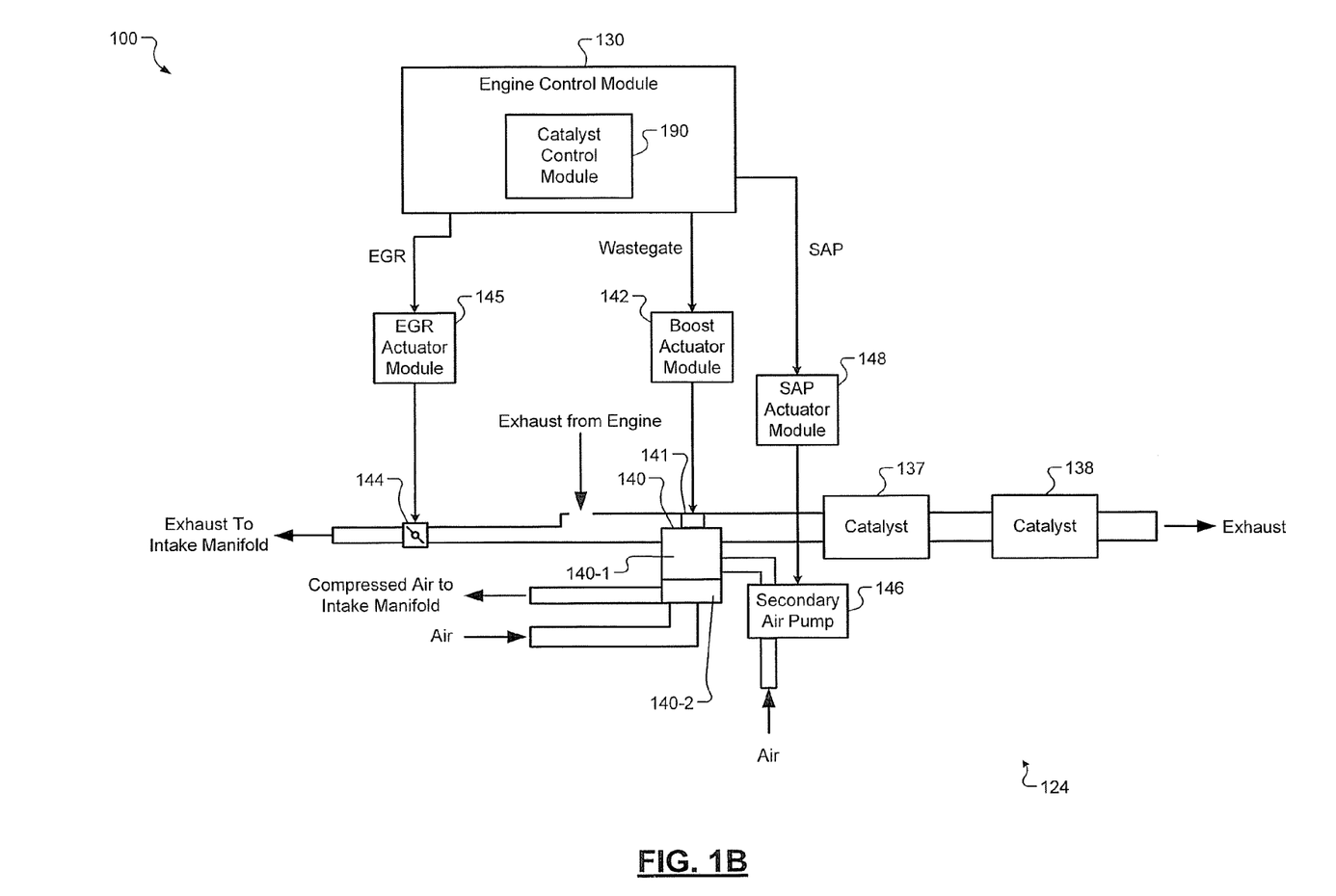

Referring now to FIG. 1A-1B, a functional block diagram of an exemplary engine system 100 is presented. The engine system 100 includes an engine 102 that combusts an air/fuel mixture to produce drive torque. Air is drawn into an intake manifold 104 through a throttle valve 106. A throttle actuator module 108 controls opening of the throttle valve 106 and, therefore, airflow into the engine 102.

Air from the intake manifold 104 is drawn into cylinders of the engine 102. While the engine 102 may include multiple cylinders, for illustration purposes only, only a single representative cylinder 110 is shown. For example only, the engine 102 may include 1, 2, 3, 4, 5, 6, 8, 10, and/or 12 cylinders. Air from the intake manifold 104 is drawn into the cylinder 110 through an associated intake valve 112. Lowering of a piston (not shown) within the cylinder 110 draws air into the cylinder 110.

An engine control module (ECM) 130 controls the amount (e.g., mass) of fuel injected by a fuel injector 114 and the timing of the injection of fuel. More specifically, a fuel actuator module 116 controls opening of the fuel injector 114 based on signals from the ECM 130. For example only, the fuel actuator module 116 may control the period of time that the fuel injector 114 is held open, which is referred to as an injection pulse width. The fuel injector 114 may inject fuel directly into the cylinder 110 as shown in FIG. 1A. In other implementations, the fuel injector 114 may inject fuel into the intake manifold 104 at a central location or may inject fuel into the intake manifold 104 at multiple locations, such as near the intake valve of each of the cylinders.

The injected fuel mixes with the air and creates the air/fuel mixture. The piston rises within the cylinder 110 and compresses the air/fuel mixture within the cylinder 110. Based upon signals from the ECM 130, a spark actuator module 118 energizes a spark plug 120, which initiates combustion of the air/fuel mixture. In other engine systems, the spark plug 120 may not be necessary to initiate combustion. The spark timing may be specified relative to the time when the piston is at its topmost position, referred to as to top dead center (TDC), the point at which the air/fuel mixture is most compressed.

Combustion of the air/fuel mixture drives the piston down, and the piston rotatably drives a crankshaft (not shown). The piston drives the crankshaft down until the piston reaches a bottom most position, referred to as to bottom dead center (BDC). The piston then begins moving up again and expels the byproducts of combustion through an exhaust valve 122 associated with the cylinder 110. The byproducts of combustion are exhausted from the vehicle via an exhaust system 124.

One engine cycle, from the standpoint of each cylinder, involves two revolutions of the crankshaft (i.e., 720° of crankshaft rotation). The engine cycle for one cylinder can be described in terms of four phases: an intake phase; a compression phase; a combustion phase; and an exhaust phase. For example, the piston lowers toward the BDC position and air is drawn into the cylinder 110 during the intake phase. The piston rises toward the TDC position and compresses the air/fuel mixture within the cylinder 110 during the compression phase. The air/fuel mixture is combusted within the cylinder 110 during the combustion phase, and the combustion drives the piston toward the BDC position. The piston rises toward the TDC to expel the exhaust gas produced via combustion from the cylinder 110 during the exhaust phase.

The intake valve 112 is controlled by an intake camshaft 126, and the exhaust valve 122 is controlled by an exhaust camshaft 128. In other implementations, multiple intake camshafts may control multiple intake valves per cylinder and/or may control the intake valves of multiple banks of cylinders. Similarly, multiple exhaust camshafts may control multiple exhaust valves per cylinder and/or may control exhaust valves for multiple banks of cylinders.

An intake cam phaser 132 controls the intake camshaft 126 and, therefore, controls opening (e.g., lift, timing, and duration) of the intake valve 112. Similarly, an exhaust cam phaser 134 controls the exhaust camshaft 128 and, therefore, controls opening (e.g., lift, timing, and duration) of the exhaust valve 122. The timing of the opening of the intake and exhaust valves 112 and 122 may be specified relative to, for example, the TDC position or the BDC position. A phaser actuator module 136 controls the intake cam phaser 132 and the exhaust cam phaser 134 based on signals from the ECM 130.

Referring to FIG. 1B, exhaust gas output by the engine 102 is provided to the exhaust system 124. Typically, the exhaust gas flows through the exhaust system 124 to a first catalyst 137. The catalyst 137 reacts with various components of the exhaust gas to reduce the amount of those components in the exhaust gas. The exhaust gas as output by the catalyst 137 may then flow to a second catalyst 138. The catalyst 138 also reacts with components of the exhaust gas. An electrically heated catalyst (EHC) (not shown) may also be implemented with the catalyst 137. In other implementations, one catalyst may be provided.

The engine system 100 includes a turbocharger 140 that provides pressurized air to the intake manifold 104. The turbocharger 140 is powered by exhaust gases flowing through the exhaust system 124, and provides a compressed air charge to the intake manifold 104. The turbocharger 140 includes a turbine 140-1 and a pump 140-2. The exhaust gas flowing through the exhaust system 124 rotatably drives the turbine 140-1. The rotation of the turbine 140-1 in turn drives the pump 140-2, and the pump provides compressed air to the intake manifold 104. The turbocharger 140 may include a variable geometry turbo (VGT) or another suitable type of turbocharger. In other vehicles, more than one turbocharger may be implemented.

A wastegate 141 selectively allows exhaust gas to bypass the turbocharger 140, thereby reducing the turbocharger's output (or boost). More specifically, the wastegate 141 allows exhaust gas to bypass the turbine 140-1. The ECM 130 controls boost of the turbocharger 140 via a boost actuator module 142.

The boost actuator module 142 may modulate the boost of the turbocharger 140 by, for example, controlling the position of the wastegate 141 and/or the turbocharger 140 itself (e.g., vane position). An intercooler (not shown) may be implemented to dissipate some of the compressed air charge's heat. This heat may be generated when the air is compressed. Another source of heat is the exhaust system 124.

The engine system 100 may also include an exhaust gas recirculation (EGR) valve 144, which selectively redirects exhaust gas back to the intake manifold 104. An EGR actuator module 145 controls opening of the EGR valve 144 based on signals from the ECM 130. While the EGR valve 144 is shown as being located upstream of the turbocharger 140, the EGR valve 144 may be located downstream of the turbocharger 140. An EGR cooler (not shown) may also be implemented to cool the redirected exhaust gas before the exhaust gas is provided to the intake manifold 104.

The engine system 100 also includes a secondary air pump (SAP) 146 that delivers air (i.e., secondary air) to the exhaust system 124. The SAP 146 is mechanically coupled to the housing of the turbocharger 140. More specifically, the SAP 146 is coupled to the housing of the turbocharger 140 in a manner that delivers the air at a location downstream of the turbine 140-1. The air delivered by the SAP 146 may be drawn from, for example, a location between the throttle valve 106 and an air filter (not shown).

The amount of heat produced in the exhaust system 124 via hydrocarbon oxidation is limited by the amount of oxygen in the exhaust system 124. The air delivered by the SAP 146 increases the amount of oxygen in the exhaust system 124 and, therefore, heat production capability via hydrocarbon oxidation. Heat produced upstream of the turbine 140-1 may be transferred to the turbine 140-1. In this manner, the turbine 140-1 may decrease the amount of heat available to warm the catalyst 137 and delay the time when the temperature of the catalyst 137 reaches the light-off temperature in engine systems where an SAP delivers air upstream of the turbocharger 140 (e.g., see FIG. 4).

Delivery of the air downstream of the turbine 140-1 as accomplished by the SAP 146 of the present disclosure, however, reduces the amount of hydrocarbon oxidation heat that is unnecessarily transferred to the turbine 140-1. In this manner, the hydrocarbon oxidation heat is provided to the catalyst 137 and the time necessary to heat the catalyst 137 to the light-off temperature is reduced.

An SAP actuator module 148 controls the SAP 146 based on signals from the ECM 130. In this manner, the ECM 130 controls operation of the SAP 146 (i.e., ON or OFF) and the amount of air provided to the exhaust system 124 by the SAP 146.

Referring again to FIG. 1A, the ECM 130 regulates the torque output of the engine 102 based on driver inputs and other inputs. The driver inputs may include, for example, accelerator pedal position, brake pedal position, cruise control inputs, and/or other suitable driver inputs. The other inputs may include, for example, inputs from various sensors and/or inputs from other controllers (not shown), such as a transmission control module, a hybrid control module, and a chassis control module.

The ECM 130 receives a crankshaft position signal from a crankshaft sensor 160. The crankshaft sensor 160 measures position (e.g., angle) of the crankshaft and generates the crankshaft position signal accordingly. The crankshaft position signal may be used to determine the rotational speed of the crankshaft (i.e., the engine speed) in revolutions per minute (rpm).

For example only, the crankshaft sensor 160 may include a variable reluctance (VR) sensor or another suitable type of crankshaft sensor. The crankshaft position signal may include a pulse train. Each pulse of the pulse train may be generated as a tooth of an N-toothed wheel (not shown), that rotates with the crankshaft, passes the VR sensor. Accordingly, each pulse corresponds to an angular rotation of the crankshaft by an amount equal to 360° divided by N teeth. The N-toothed wheel may also include a gap of one or more missing teeth, and the gap may be used as an indicator of one complete rotation of the crankshaft.

The ECM 130 receives an engine coolant temperature (ECT) signal from an ECT sensor 162. The ECT sensor 162 measures the temperature of engine coolant and generates the ECT signal accordingly. While the ECT sensor 162 is shown as being located within the engine 102, the ECT sensor 162 may measure the ECT at another suitable location where the engine coolant is circulated. The ECM 130 may also receive signals from other sensors, such as, a manifold absolute pressure (MAP) sensor, a mass air flow (MAF) sensor, a throttle position sensor, an intake air temperature (IAT) sensor, a cylinder pressure sensor, and/or other suitable sensors.

The ECM 130 includes a catalyst control module 190 according to the principles of the present disclosure. The catalyst control module 190 selectively enables a light-off mode for the catalyst 137. When the light-off mode is enabled, the catalyst control module 190 retards the spark timing and provides fuel to the cylinder 110 in two separate injections. Providing the fuel to the cylinder 110 in the two separate fuel injections and retarding the spark timing provides hydrocarbons to the exhaust system 124 for oxidation.

The catalyst control module 190 of the present disclosure also provides a third (i.e., tertiary) fuel injection to the cylinder 110 during the exhaust phase (i.e., stroke) of each engine cycle for the cylinder 110. The exhaust phase corresponds to when the piston is moving toward the TDC position within the cylinder 110 to expel the contents of the cylinder 110 to the exhaust system 124.

The third injection of fuel provides an additional amount of hydrocarbons in the exhaust gas without affecting the combustion of the air/fuel mixture. The additional hydrocarbons allow for more hydrocarbon oxidation and, therefore, faster warming of the catalyst 137 to the light-off temperature. While the catalyst control module 190 is shown and described being located within the ECM 130, the catalyst control module 190 may be located in another suitable location, such as external to the ECM 130.

Figure 2:
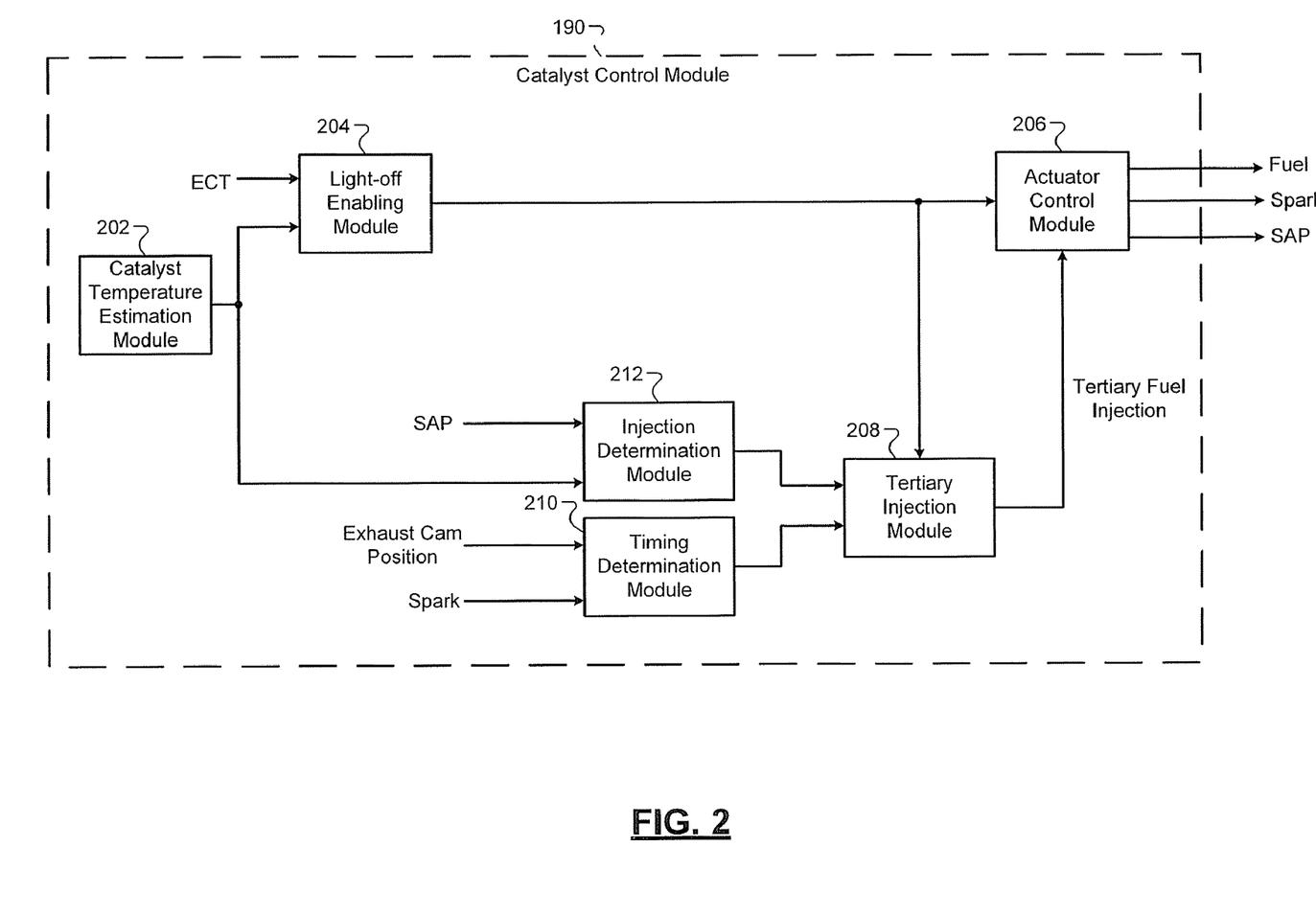
FIG. 2 is a functional block diagram of an exemplary catalyst control module according to the principles of the present disclosure.

Referring now to FIG. 2, a functional block diagram of an exemplary implementation of the catalyst control module 190 is presented. The catalyst control module 190 includes a catalyst temperature estimation module 202, a light-off enabling module 204, and an actuator control module 206. The catalyst control module 190 also includes a tertiary injection module 208, a timing determination module 210, and an injection determination module 212.

The catalyst temperature estimation module 202 estimates the temperature of the catalyst 137 and outputs an estimated catalyst temperature accordingly. The catalyst temperature estimation module 202 may estimate the catalyst temperature based on, for example, exhaust temperatures measured upstream and downstream of the catalyst 137, the ECT, combustion characteristics, and/or other suitable parameters.

The light-off enabling module 204 selectively enables the light-off mode for the catalyst 137. The light-off enabling module 204 selectively enables the light-off mode after startup of the engine 102 (e.g., key ON). The light-off enabling module 204 selectively enables the light-off mode based on the ECT and the estimated catalyst temperature.

For example only, the light-off enabling module 204 selectively enables the light-off mode when the ECT is greater than a predetermined coolant temperature and the estimated catalyst temperature is less than a predetermined catalyst temperature. The predetermined coolant temperature and the predetermined catalyst temperature maybe calibratable and may be set to, for example only, 0° C. and between 300° C. and 500° C., respectively.

The light-off enabling module 204 may also enable the light-off mode based on a driver torque request. The driver torque request corresponds to an engine torque output requested by a driver of the vehicle. The driver torque request may be determined based on, for example, an accelerator pedal position and/or other driver inputs (e.g., cruise control). For example only, the light-off enabling module 204 may enable the light-off mode when the driver torque request is less than a predetermined torque.

The actuator control module 206 controls various engine parameters, such as the amount and timing of fuel injection, the spark timing, and air provided by the SAP 146. The actuator control module 206 may also control other engine parameters, such as the intake and exhaust cam positions, opening of the throttle valve 106, and/or other suitable parameters.

The actuator control module 206 adjusts various engine parameters when the light-off mode is enabled. For example, the actuator control module 206 retards the spark timing when the light-off mode is enabled. The actuator control module 206 also provides fuel to the cylinder 110 in the two separate injections for each combustion event when the light-off mode is enabled. The actuator control module 206 also enables the SAP 146 and controls the SAP 146 to provide air to the exhaust system 124 when the light-off mode is enabled. The actuator control module 206 may also activate an EHC to provide additional heat while the light-off mode is enabled.

The tertiary injection module 208 is enabled when the light-off mode is enabled. In this manner, the light-off enabling module 204 selectively enables the tertiary injection module 208. Otherwise, the tertiary injection module 208 may be disabled or inactive. The tertiary injection module 208 commands the actuator control module 206 to provide a third injection of fuel to the cylinder 110 during each engine cycle while the light-off mode is enabled. In this manner, the tertiary injection module 208 provides the third injection of fuel to the cylinder 110 during each engine cycle while the light-off mode is enabled.

The third injection of fuel is provided to the cylinder 110 during the exhaust phase of the engine cycle. The timing determination module 210 determines a desired timing for the third fuel injection. For example only, the timing determination module 210 determines the desired timing based on the exhaust cam position and the spark timing. The desired timing may be determined in terms of, for example, crankshaft angle. The timing determination module 210 provides the desired timing to the tertiary injection module 208, and the tertiary injection module 208 provides the third fuel injection to the cylinder 110 at the desired timing during the exhaust phase of the engine cycle.

The injection determination module 212 determines a desired amount (e.g., mass) of fuel for the third fuel injection. For example only, the timing determination module 210 determines the desired amount based on the estimated catalyst temperature and the amount of air provided by the SAP 146. The injection determination module 212 provides the desired amount to the tertiary injection module 208. The tertiary injection module 208 provides the third fuel injection based on the desired amount at the desired timing during the exhaust phase of the engine cycle. The tertiary injection module 208 may also convert the desired amount into, for example, a pulse width (i.e., opening time) for the fuel injector 114 to inject the desired amount of fuel.

Figure 3:
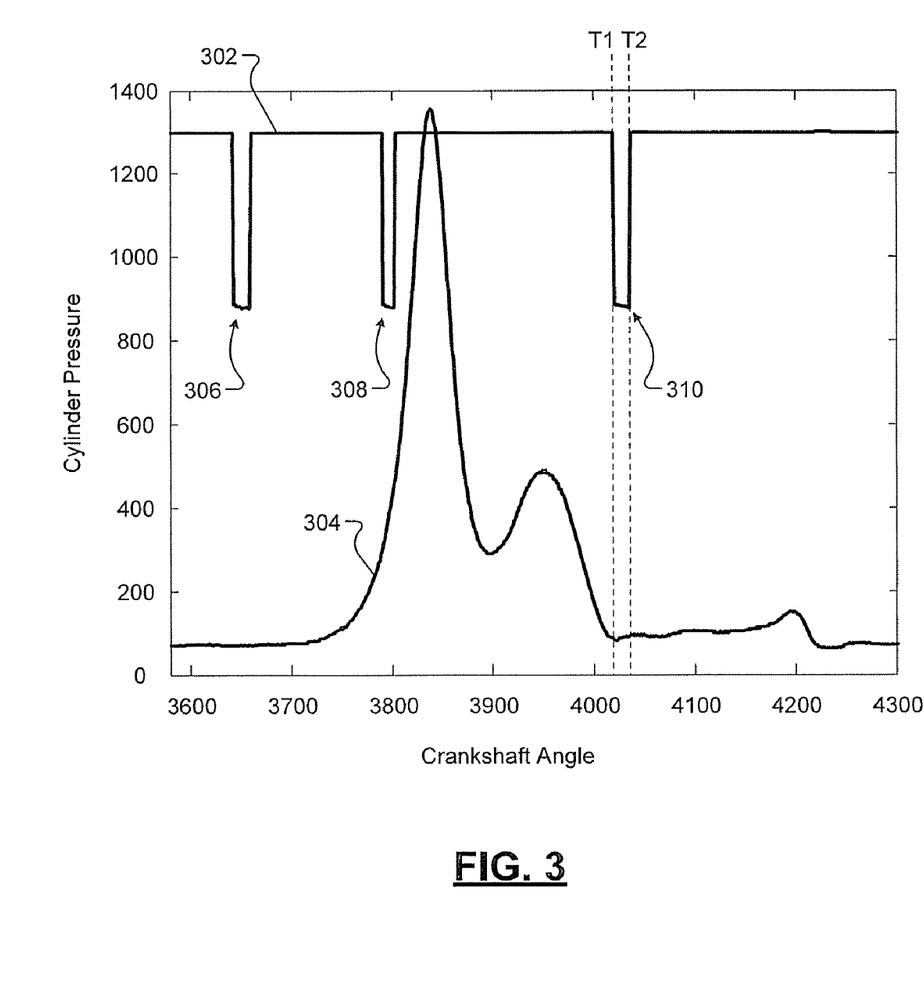
FIG. 3 is a graph depicting exemplary fuel injection and cylinder pressure traces versus crankshaft angle according to the principles of the present disclosure.

Referring now to FIG. 3, an exemplary graph of fuel injection and cylinder pressure versus crankshaft angle is presented. Exemplary trace 302 tracks the provision of fuel to the cylinder 110. Exemplary trace 304 tracks cylinder pressure measured within the cylinder 110. Fuel injection is separated into two separate fuel injections and the spark timing is retarded when the light-off mode is enabled. The two fuel injections can be seen as first injection 306 and second injection 308.

The timing of the two injections 306 and 308 may be specified relative to, for example, the TDC position or the BDC position. For example only, the first and second injections 306 and 308 may be accomplished during the intake phase and the combustion phase of the engine cycle for the cylinder 110.

The catalyst control module 190 of the present disclosure also provides a third injection of fuel to the cylinder 110 during the exhaust phase of each engine cycle. An exemplary third injection of fuel is shown as 310. The third injection 310 begins at exemplary time T1. In other words, the catalyst control module 190 opens the fuel injector 114 at time T1 to provide fuel to the cylinder 110. Time T1 occurs during the exhaust phase of the engine cycle. The catalyst control module 190 determines the desired timing for time T1 based on, for example, the exhaust cam position and the spark timing.

The third injection 310 ends at exemplary time T2. In other words, the catalyst control module 190 closes the fuel injector 114 at time T2. The period of time between times T1 and T2 may be referred to as a pulse width. Assuming that the fuel injector 114 injects fuel at a predetermined flowrate when the fuel injector 114 is open, the catalyst control module 190 may control the pulse width to inject the desired amount of fuel. In this manner, the catalyst control module 190 provides the desired amount of fuel to the cylinder 110 for the third fuel injection.

Figure 4:
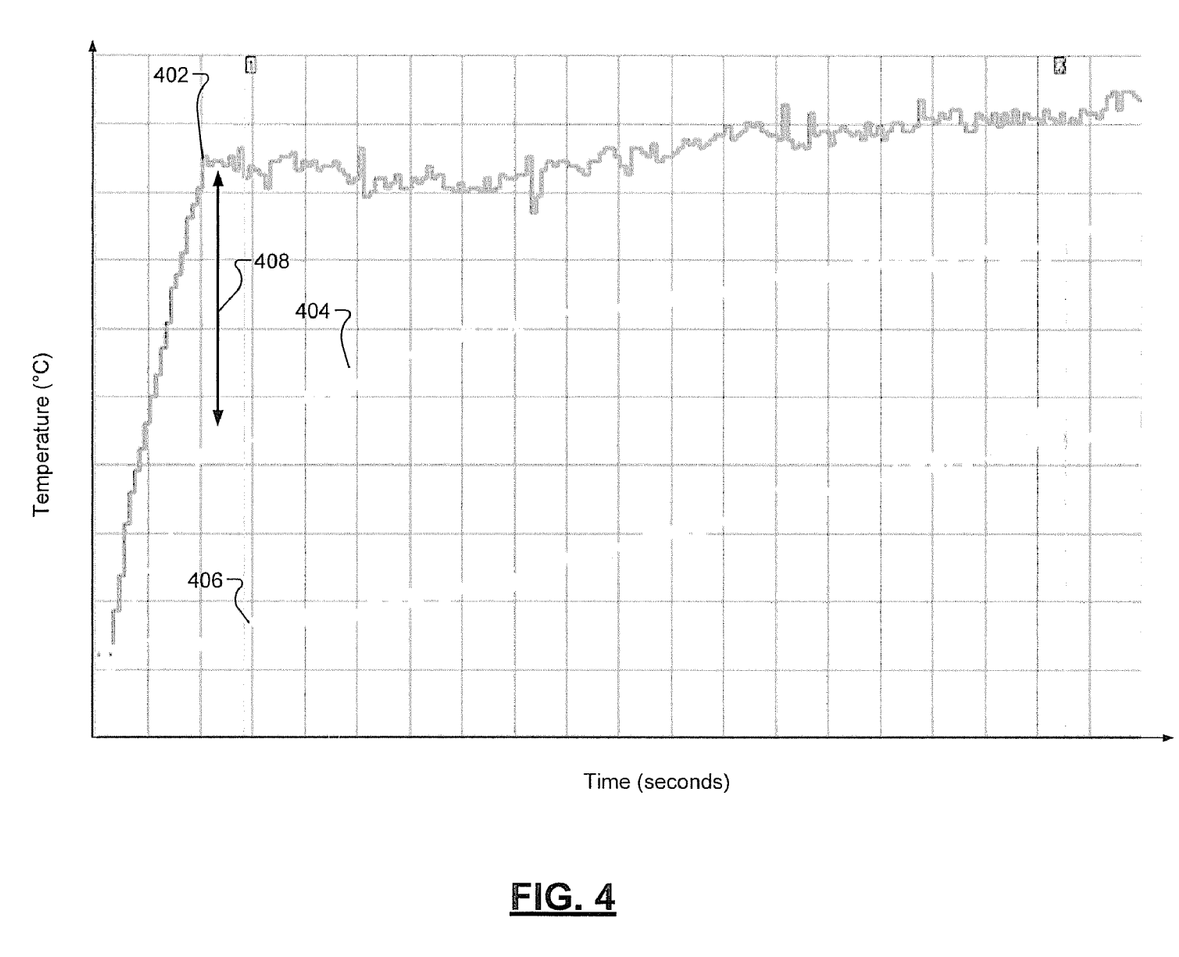
FIG. 4 is a graph depicting exemplary exhaust system temperature traces versus time according to the principles of the present disclosure.

Referring now to FIG. 4, an exemplary illustration of various exhaust temperatures versus time is presented. Exemplary trace 402 tracks exhaust temperature measured near an inlet to a turbocharger (i.e., turbine). Exemplary trace 404 tracks exhaust temperature measured near an outlet of the turbocharger. Exemplary trace 406 tracks a measured catalyst temperature downstream of the turbocharger.

The temperatures 402, 404, and 406 are shown for an engine system including a SAP that provides air to an exhaust system upstream of the turbocharger. For example only, the SAP may provide air to the exhaust system at the cylinder head of the engine. Oxidation of hydrocarbons in the exhaust gas produces heat. As some of the heat is produced upstream of the turbocharger, however, heat is transferred to the turbine of the turbocharger. Thus, measurable a temperature drop 408 is present between the inlet and outlet exhaust temperatures 402 and 404.

The SAP 146 of the present disclosure, however, supplies air downstream of the turbine 140-1 of the turbocharger 140. Accordingly, the heat produced via hydrocarbon oxidation is downstream of the turbine 140-1. A lesser amount of oxidation heat is transferred to the turbine 140-1 than the amount of heat lost to the turbine described in FIG. 4. The temperature of the catalyst 137 should therefore increase at a faster rate than the catalyst temperature 406 and should reach the light-off temperature faster than the catalyst temperature 406.

Figure 5:
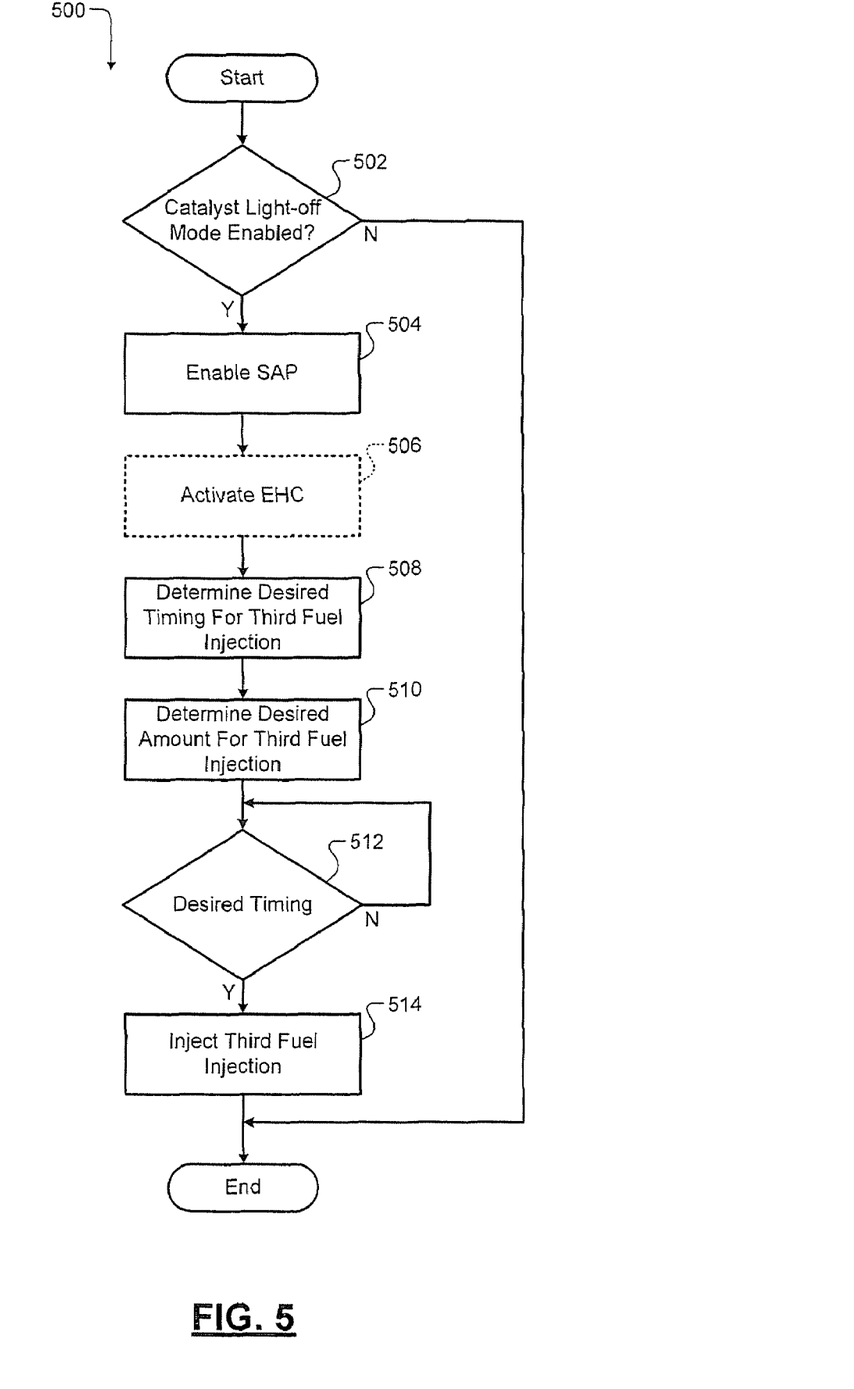
FIG. 5 is a flowchart depicting an exemplary method according to the principles of the present disclosure.

Referring now to FIG. 5, a flowchart depicting an exemplary method 500 is presented. The method 500 begins in step 502 where the method 500 determines whether the catalyst light-off mode is enabled. In another implementation, the method 500 determines whether to enable the catalyst light-off mode in step 502. If true, the method 500 proceeds to step 504; if false, the method 500 ends. The light-off mode may be enabled when, for example, the ECT is greater than the predetermined coolant temperature, the estimated catalyst temperature is less than the predetermined catalyst temperature, and the driver torque request is less than the predetermined torque.

In step 504, the method 500 enables the SAP 146. In this manner, the method 500 supplies air (and therefore oxygen) to the exhaust system 124 for hydrocarbon oxidation. The SAP 146 supplies air downstream of the turbine 140-1 of the turbocharger 140. In one implementation, the method 500 may activate an electrically heated catalyst (EHC) associated with the catalyst 137 in step 506. In other words, the method 500 may apply power to the EHC to provide heat to the catalyst 137.

The method 500 determines a desired timing for the third fuel injection in step 508. The method 500 determines the desired timing based on the exhaust cam position and the spark timing. The desired timing for the third fuel injection falls within the exhaust phase of the engine cycle for the cylinder 110.

The method 500 determines the desired amount for the third fuel injection in step 510. The method 500 determines the desired amount based on the air provided by the SAP 146 and the estimated catalyst temperature. In step 512, the method 500 determines whether the desired timing for the third injection has arrived. If false, the method 500 remains in step 512. If true, the method 500 injects the third fuel injection according to the desired amount in step 514, and the method 500 ends.

Those skilled in the art can now appreciate from the foregoing description that the broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification, and the following claims.

What is claimed is:

1. An engine control system comprising:
   an actuator control module that provides secondary air to an exhaust system when a catalyst light-off mode is enabled and that provides first and second injections of fuel to a cylinder during each engine cycle while said catalyst light-off mode is enabled; and
   a tertiary injection module that selectively provides a third injection of fuel to said cylinder during an exhaust phase of each engine cycle while said catalyst light-off mode is enabled,
   wherein said first, second, and third injections are each separated by a period of time.

2. The engine control system of claim 1 wherein said actuator control module retards a spark timing for said cylinder when said catalyst light-off mode is enabled.

3. The engine control system of claim 1 further comprising a secondary air pump that provides said secondary air to said exhaust system downstream of a turbine of a turbocharger.

4. The engine control system of claim 3 wherein said secondary air pump provides said secondary air downstream of said turbine by way of a coupling to a housing of said turbocharger.

5. The engine control system of claim 1 further comprising a timing determination module that determines a desired timing based on an exhaust cam position and a spark timing,
   wherein said tertiary injection module provides said third injection at said desired timing.

6. The engine control system of claim 1 further comprising an injection determination module that determines a desired amount based on said secondary air and an estimated temperature of a catalyst disposed in said exhaust system,
wherein said tertiary injection module provides said third injection based on said desired amount.

7. The engine control system of claim 1 further comprising a light-off enabling module that selectively enables said catalyst light-off mode based on at least one of an engine coolant temperature, an estimated temperature of a catalyst disposed within said exhaust system, and a driver torque request.

8. The engine control system of claim 7 wherein said light-off enabling module enables said catalyst light-off mode when said engine coolant temperature is greater than a predetermined coolant temperature.

9. The engine control system of claim 7 wherein said light-off enabling module enables said catalyst light-off mode when said estimated temperature is less than a predetermined catalyst temperature.

10. The engine control system of claim 7 wherein said light-off enabling module enables said catalyst light-off mode when said engine coolant temperature is greater than a predetermined coolant temperature, said estimated temperature is less than a predetermined catalyst temperature, and said driver torque request is less than a predetermined torque.

11. An engine control method comprising:
providing secondary air to an exhaust system when a catalyst light-off mode is enabled;
providing first and second injections of fuel to a cylinder during each engine cycle while said catalyst light-off mode is enabled; and
selectively providing a third injection of fuel to said cylinder during an exhaust phase of each engine cycle while said catalyst light-off mode is enabled,
wherein said first, second, and third injections are each separated by a period of time.

12. The engine control method of claim 11 further comprising retarding a spark timing for said cylinder when said catalyst light-off mode is enabled.

13. The engine control method of claim 11 further comprising providing said secondary air to said exhaust system downstream of a turbine of a turbocharger.

14. The engine control method of claim 13 further comprising providing said secondary air downstream of said turbine by way of a coupling to a housing of said turbocharger.

15. The engine control method of claim 11 further comprising:
determining a desired timing based on an exhaust cam position and a spark timing; and
providing said third injection at said desired timing.

16. The engine control method of claim 11 further comprising:
determining a desired amount based on said secondary air and an estimated temperature of a catalyst disposed in said exhaust system; and
providing said third injection based on said desired amount.

17. The engine control method of claim 11 further comprising selectively enabling said catalyst light-off mode based on at least one of an engine coolant temperature, an estimated temperature of a catalyst disposed within said exhaust system, and a driver torque request.

18. The engine control method of claim 17 further comprising enabling said catalyst light-off mode when said engine coolant temperature is greater than a predetermined coolant temperature.

19. The engine control method of claim 17 further comprising enabling said catalyst light-off mode when said estimated temperature is less than a predetermined catalyst temperature.

20. The engine control method of claim 17 further comprising enabling said catalyst light-off mode when said engine coolant temperature is greater than a predetermined coolant temperature, said estimated temperature is less than a predetermined catalyst temperature, and said driver torque request is less than a predetermined torque.

* * * * *